July 14, 1931.    G. MILLIGAN    1,814,727
CAMERA USING ROLL FILMS

Filed Oct. 29, 1929

INVENTOR
GEORGE MILLIGAN
BY Ruege, Boyer & Baleilar
ATTORNEYS

Patented July 14, 1931

1,814,727

UNITED STATES PATENT OFFICE

GEORGE MILLIGAN, OF MANCHESTER, ENGLAND

CAMERA USING ROLL FILMS

Application filed October 29, 1929, Serial No. 403,149, and in Great Britain November 16, 1928.

This invention has reference to the manufacture of cameras using roll films and has for its object to provide means whereby the exposed films can be wound up tightly on the receiving spool, which will avoid the scratching which often takes place at present when the spool of exposed film is held and tightened by turning the spool, or by continuous tension in the camera during winding, or by exerting pressure on the paper and film as it is wound up on the spool.

According to this invention a roll film camera is provided with a pressure member which when pressed by the operator on the paper of the film as it passes over a part of the camera near to, but not on the spool on which the exposed film is wound will apply sufficient drag to the film to ensure that it will be wound tightly on the spool.

The invention is more particularly set forth with reference to the accompanying drawings in which—

Figure 1:
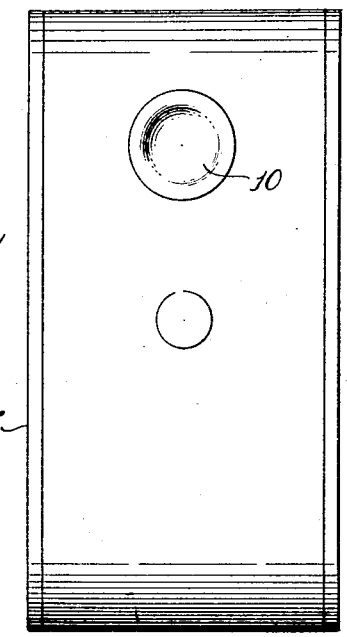
Fig. 1 is a back view of a camera.
Figure 2:
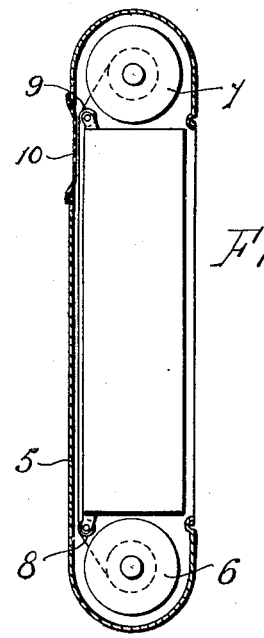
Fig. 2 is a sectional view showing one application of the invention.

Referring to the drawings, and first to Figs. 1 and 2, the camera 5 is provided with a spool 6 on which the unexposed film is carried and a spool 7 on to which it is wound, the film being carried over rollers 8 and 9. In the back of the camera near the roller 9 and the spool 7 on which the exposed film is wound is an opening through which a flexible diaphragm can be depressed sufficiently to bear upon the paper lying behind the film. The flexible diaphragm may be placed in such a position that when winding the film on the spool, the thumb of the left hand normally and conveniently rests on the diaphragm. Thus, by exerting a slight pressure with the thumb, pressure is put on the paper and the film below it, sufficient to maintain it tight and effect a braking during the winding of the film.

By this arrangement the film will be wound up tightly on the spool 7, and when the spool is removed from the camera, there will be no need for any additional tightening which, as already stated, in the ordinary way often injures the film by scratching it.

Figure 3:
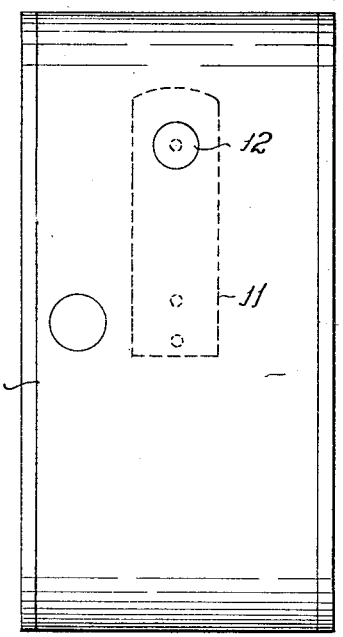
Figs. 3 and 4 are similar views showing a different construction.
Figure 4:
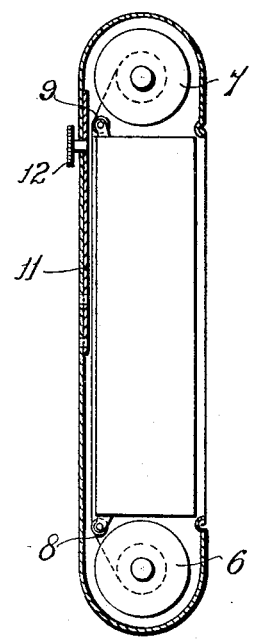

In Figs. 3 and 4 a modification of the invention is shown and in this construction instead of a flexible diaphragm 10, a thin piece of metal 11 is mounted on the inside of the camera back, and is provided with a press button 12 by which the flexible metal can be pressed on to the paper carrying the film.

What I claim as my invention and desire to secure by Letters Patent is:—

1. In a roll film camera, a body portion having a back, a film-supplying spool and a film-receiving spool disposed in said body portion respectively at opposite ends of said back, a guide roller adjacent to each of said spools and over which the film passes, and a flexible member carried by said back in proximity to the guide roll adjacent the film-receiving spool, said flexible member being normally out of contact with the film but adapted under manual pressure to exert a drag on said film during the winding thereof whereby the film is tightly wound on the receiving spool.

2. In a roll film camera, a body portion having a back, a film-supplying spool and a film-receiving spool disposed in said body portion respectively at opposite ends of said back, a guide roller adjacent to each of said spools and over which the film passes, and a flexible member mounted on the inner side of said back and secured thereto at one end, said flexible member having a knob near its opposite end projecting through said back and adapted under manual pressure to exert a drag on said film during the winding thereof.

3. In a roll film camera, a body portion having a back, a film-supplying spool and a film-receiving spool disposed in said body portion respectively at opposite ends of said back, a guide roller adjacent to each of said spools and over which the film passes, said back being provided with a hole near the film-receiving spool, and a flexible member in light-tight engagement with said hole and adapted under manual pressure to exert a drag on the film as it passes over the roller adjacent to said film-receiving spool thereby to insure the tight winding of the film on said spool.

In testimony whereof I have signed my name to this specification.

GEORGE MILLIGAN.